United States Patent [19]

Aoki et al.

[11] 4,413,283

[45] Nov. 1, 1983

[54] SOLID-STATE IMAGING DEVICE

[75] Inventors: Masakazu Aoki, Kodaira; Haruhisa Ando, Hachioji; Shinya Ohba, Kanagawa; Iwao Takemoto, Tokyo, all of Japan

[73] Assignee: Hitachi, Ltd., Tokyo, Japan

[21] Appl. No.: 332,933

[22] Filed: Dec. 21, 1981

[30] Foreign Application Priority Data

Dec. 26, 1980 [JP] Japan ............................ 55-186391[U]

[51] Int. Cl.³ .............................................. H04N 3/14
[52] U.S. Cl. ................................................... 358/213
[58] Field of Search ................... 358/212, 213, 44, 48; 357/30; 250/211 J, 578

[56] References Cited

FOREIGN PATENT DOCUMENTS 56-152382 11/1981 Japan .................................... 358/213

Primary Examiner—John C. Martin
Attorney, Agent, or Firm—Antonelli, Terry & Wands

[57] ABSTRACT

A solid-state imaging device comprises a plurality of photodiodes arranged in a matrix form in the same semiconductor substrate, horizontal and vertical switching elements for selecting the photodiodes, horizontal and vertical shift registers for supplying scan pulses to the horizontal and vertical switching elements, and an interlace circuit for simultaneously selecting two vertical gate lines to simultaneously read two picture element rows. A buffer circuit is inserted between the interlace circuit and the vertical gate lines for changing a potential level of one of the two selected vertical gate lines from a high level to a low level prior to changing the potential level of the other vertical gate line.

9 Claims, 8 Drawing Figures

SOLID-STATE IMAGING DEVICE

The present invention relates to a solid-state imaging device.

FIG. 1 shows a schematic diagram of a conventional solid-state area image sensor. It comprises a number of photodiodes 1 as photo-electric conversion elements arranged in a matrix form, vertical switching insulated gate field effect transistors (MOSTs) 2 and horizontal switching MOSTs 3 for reading out desired signals stored in the photodiodes 1, and vertical and horizontal shift registers 4 and 5 for sequentially switching the switches 2 and 3. A part including the photodiode 1 and the vertical switching MOST 2 for each picture element forms a photosensing part. Numeral 6 denotes vertical gate lines, numeral 7 denotes vertical signal output lines, numerals 8, 16, 17, 18 and 19 denote horizontal gate lines, and numerals 9 and 10 denote horizontal signal output lines which are connected to signal output terminals. The vertical and horizontal switching MOSTS 2 and 3 have their gate voltages controlled by the shift registers 4 and 5 to carry out the switching operations.

In order to improve a vertical resolution in such an imaging device, a signal readout scheme called an interlace mode operation has been used. By way of example, when the vertical gate lines 6 are designated by A, B, . . . from the bottom to the top in FIG. 1, signals on the lines A+B, C+D, E+F, . . . are read in a first field period, and signals on the lines A, B+C, D+E, . . . are read in a second field period.

In FIG. 1, numeral 11 denotes an interlace circuit which allocates the output pulses or vertical scan pulses of the vertical shift register 4 to the vertical gate lines of the respective fields $F_1$ and $F_2$. FIG. 2 shows a conventional interlace circuit. In FIG. 2, the pulses are applied to the vertical gate lines in the sequence of A+B, C+D, E+F, . . . in the first field ($F_1$) period, to read the signals. In the next field ($F_2$) period, the pulses are applied in the sequence of A, B+C, D+E, . . . to read the signals. In this manner, the signals are read in the interlace mode. A timing of the pulses of the circuit of FIG. 2 is shown in FIG. 3.

In the signal readout scheme of the solid-state imaging device of FIG. 1 in conjunction with FIGS. 2 and 3, a D.C. level of a video signal varies depending on a field so that a flicker appears on a reproduced picture image. A mechanism of the generation of the flicker is explained with reference to FIGS. 4 and 5. FIG. 4 shows some picture elements in the photosensing part shown in FIG. 1. Each picture element comprises a photodiode 43 and a vertical switching MOST 44. Numerals 30, 31 and 32 denote vertical gate lines, numerals 41 and 42 denote coupling capacitances, numeral 43 denotes photodiodes, numeral 44 denotes vertical switching MOSTs and numerals 46 and 47 denote vertical signal output lines to which video bias voltages $V_V$ are externally applied. Considering a potential $V_{SC}$ of the photodiode 43, when a potential of the vertical gate line C (31) is high, $V_{SC}$ is substantially equal to the video bias $V_V$ so that a reset state is attained, but when the potential of C is low, $V_{SC}$ falls because of the coupling capacitance which is parasitically present between the vertical gate line and the photodiode. The coupling capacitance varies with the field. FIG. 5 shows a variation thereof and a pulse timing.

Referring to FIG. 5, in the first field in which the first field switching pulse $F_1$ is of high level, the vertical gate lines C (31) and D (32) are selected at the same timing, and in the second field in which the second field switching pulse $F_2$ is of high level, the vertical gate lines B (30) and C (31) are simultaneously selected. Considering $V_{SC}$, when the vertical gate line C changes from the high level to the low level (at the timing shown by 53 and 55) in the $F_1$ field, only $C_{PC1}$ (41) acts as the coupling capacitance because the vertical gate line B remains at the low level. As a result, the drop $\Delta V_{S1}$ of $V_{SC}$ is small as shown by 51 in FIG. 5. On the other hand, when the vertical gate line C changes from the high level to the low level (at timing 54) in the $F_2$ field, the vertical gate line B also changes from the high level to the low level. As a result, both $C_{PC1}$ (41) and $C_{PB2}$ (42) act as the coupling capacitance so that the drop of $V_{SC}$ ($\Delta V_{S2}$ 52 in FIG. 5) is larger than that in the $F_1$ field.

Since the drops of $V_{SC}$ are superimposed on drops (56, 57) due to the optical signal, a signal equivalent to $\Delta V_{S2} - \Delta V_{S1}$ apparently appears or disappears in each field so that the flicker appears in each field of the reproduced picture image particularly when the signal is low. Accordingly, when the device is used under a low illumination, the reproduced picture image is of low quality because of the flicker and the flicker materially deteriorates the characteristic of the solid-state imaging device.

It is an object of the present invention to provide a flicker free readout system in a solid-state imaging device operated in an interlace mode by simultaneous selection of two vertical gate lines or picture element rows.

It is another object of the present invention to provide a high sensitivity solid-state imaging device which can produce a high quality of image even at a low illumination.

In order to achieve the above objects, in the solid-state imaging device of the present invention operated in the interlace mode by the simultaneous selection of two vertical gate lines or picture element rows a buffer circuit is provided between the vertical gate lines and the interlace circuit to first turn off the vertical gate line associated with the picture element which has a coupling capacitance with only one of the two simultaneously selected vertical gate lines, and to thereafter turn off the vertical gate line associated with the picture element which has coupling capacitances with both of the simultaneously selected vertical gate lines.

The present invention will now be explained in conjunction with the accompanying drawings, in which.

Figure 6:
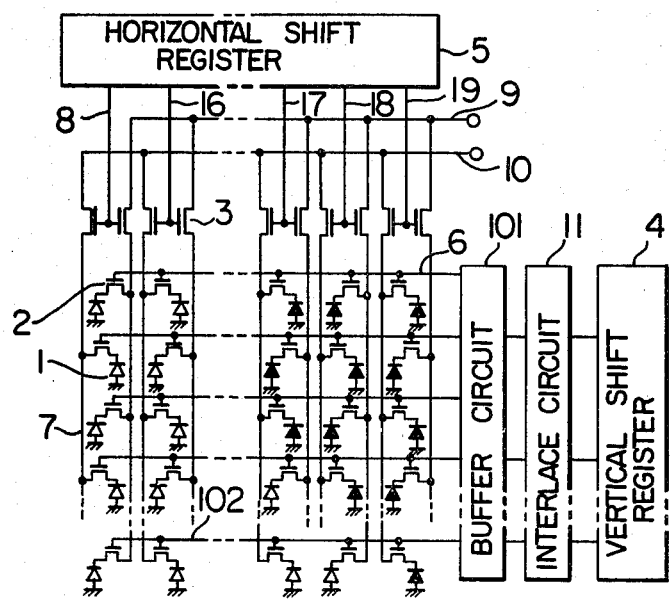
FIG. 6 shows a schematic circuit diagram of a solid-state imaging device according to an embodiment of the present invention.
Figure 7:
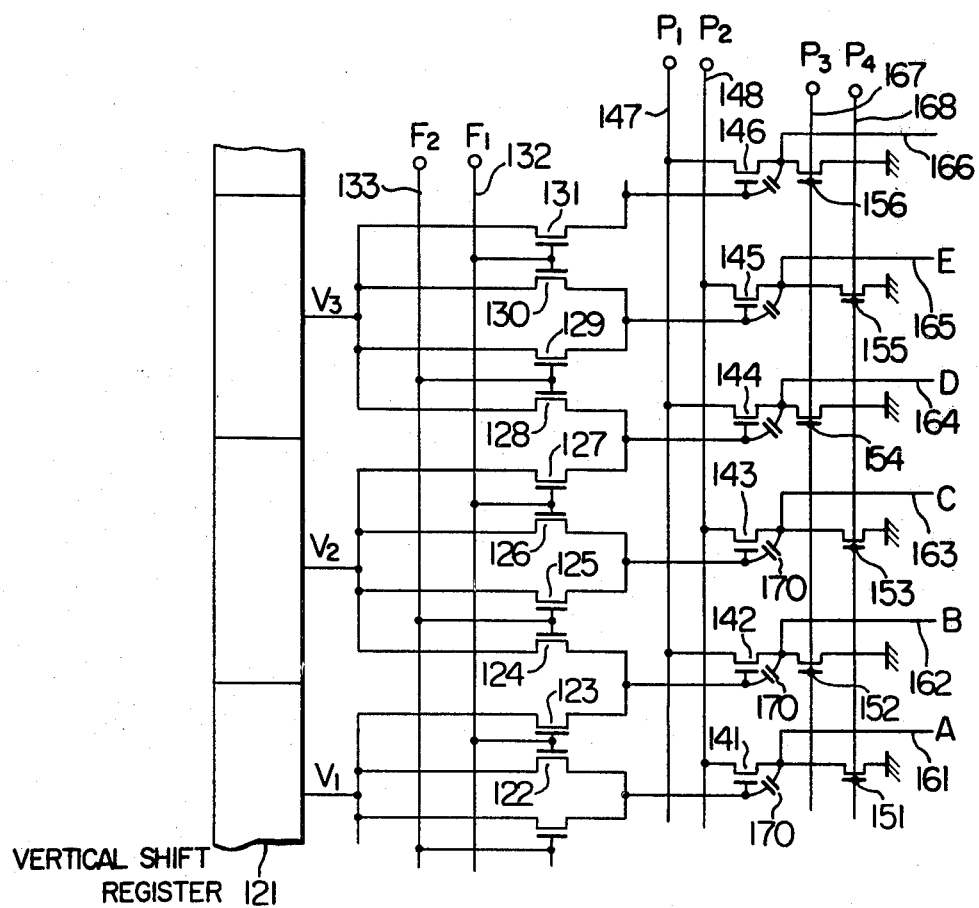
FIG. 7 shows a circuit diagram of a buffer circuit show in FIG. 6 together with an interface circuit and a vertical shift register.

In FIG. 6 which shows a schematic circuit diagram of a solid-state imaging device according to one embodiment of the present invention, numeral 101 denotes a novel buffer circuit. FIG. 7 shows an example of the buffer circuit together with a vertical shift register and an interlace circuit, and FIG. 8 shows a timing chart for explaining the operation of the buffer circuit of FIG. 7.

In FIG. 7, numeral 121 denotes a part of the vertical shift register 4. Numerals 122 to 131 denote field switching MOSTs for interlace operation, four field switching MOSTs being provided for each stage of the vertical shift register, numerals 132 and 133 denote first and second field pulse lines for supplying first and second field switching pulses $F_1$ and $F_2$, and these elements forms an interlace circuit 11. Numerals 161 to 166 denote vertical gate lines, numerals 147 and 148 denote first and second drive pulse lines for supplying first and second drive pulses $P_1$ and $P_2$ which are to be applied to the vertical gate lines and are synchronized with the vertical scan pulses $V_1$ to $V_3$ from the vertical shift register 121, numerals 141 to 146 denote transfer MOSTs for sequentially selecting $P_1$ and $P_2$, numeral 170 denotes bootstrap capacitances, numerals 167 and 168 denote first and second reset lines for supplying first and second reset pulses $P_3$ and $P_4$ to fully turn off the voltages on the vertical gate lines, and numerals 151 to 156 denote reset MOSTs controlled by the reset pulses $P_3$ and $P_4$.

Figure 8:
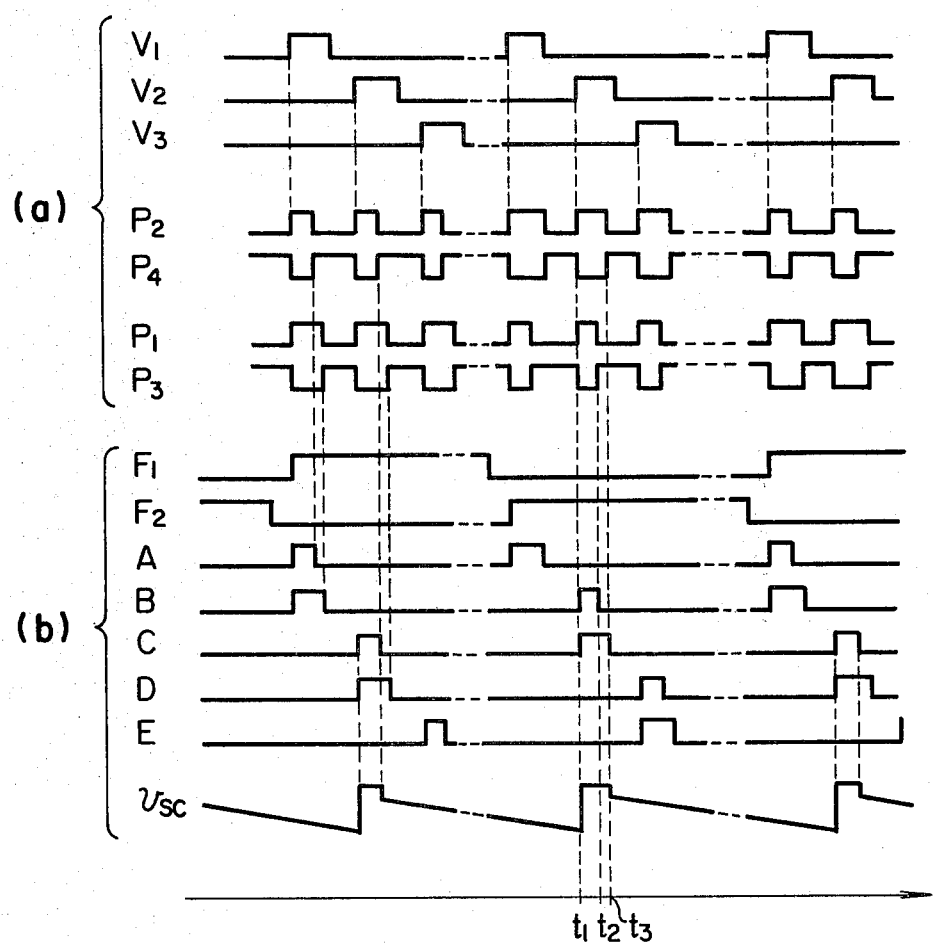
FIG. 8 shows a timing chart of pulses for explaining the operation of the buffer circuit shown in FIG. 7.

Referring to the timing chart shown in FIG. 8, the operation of the buffer circuit of FIG. 7 is now explained.

The first and second field pulses $F_1$ and $F_2$ select the corresponding field switching MOSTs (122 to 131). For example, when $F_2$ is ON (high level), the pairs of MOSTs 124, 125; 128, 129,; . . . are selected. This corresponds to the selection of the pairs of vertical gate lines B, C; D, E; . . . . When $F_1$ is ON, the pairs of MOSTs 122, 123; 126, 127; 130, 131 are selected. It corresponds to the selection of the vertical gate lines A, B; C, D; . . . . In this manner, the interlace operation is carried out by $F_1$ and $F_2$.

For example, if the pulses $P_1$ and $P_2$ are turned ON (high level) when $V_2$ is ON (high level) and $F_2$ is ON, the corresponding gate lines 162 (B) and 163 (C) are turned ON (high level) (at time $t_1$ in FIG. 8). By the provision of the bootstrap capacitances 170 as shown in FIG. 7, the potentials on the vertical gate lines are raised to the high levels of the pulses $P_1$ and $P_2$ independently of the threshold voltages of the transistors (142, 143).

After the signals of the photodiodes have been read onto the vertical signal output lines, $P_1$ is turned OFF (low level) and $P_3$ is turned ON (high level) so that the vertical gate line 162 (B) is turned OFF (low level) (at time $t_2$). After the line B has been turned OFF, $P_2$ is turned OFF (low level) and $P_4$ is turned ON (high level) so that the line C is turned OFF (low level).

Thus, by controlling the timing of $P_1$ to $P_4$ as shown in (a) of FIG. 8 by the buffer circuit shown in FIG. 7, the vertical gate line B can be turned OFF prior to the vertical gate line C. This is true for the pairs of D and E, . . . which have been selected. In the field in which $F_1$ is ON, the pairs A, B; C, D; . . . are selected. In this case, by exchanging the timings of $P_1$ and $P_2$, and $P_3$ and $P_4$, the gate line A can be turned OFF prior to B, and the gate line C can be turned OFF prior to D.

Figure 1:
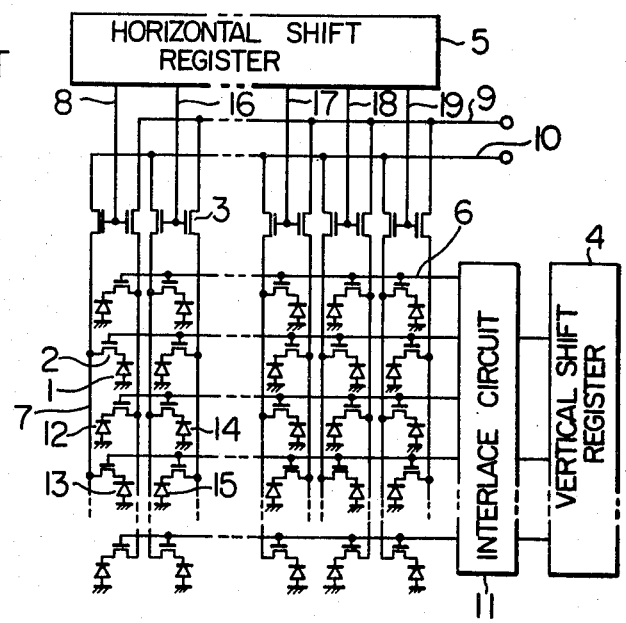
FIG. 1 shows a schematic circuit diagram of a conventional MOS solid-state area imaging device.
Figure 2:
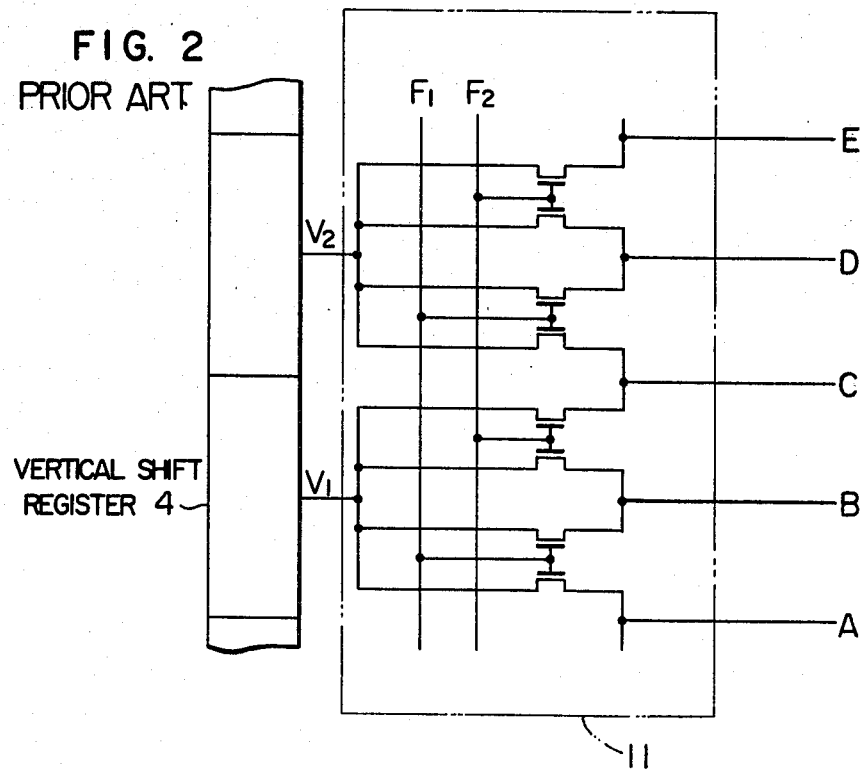
FIG. 2 shows a circuit diagram of an interlace circuit shown in FIG. 1 together with a vertical shift register.
Figure 3:
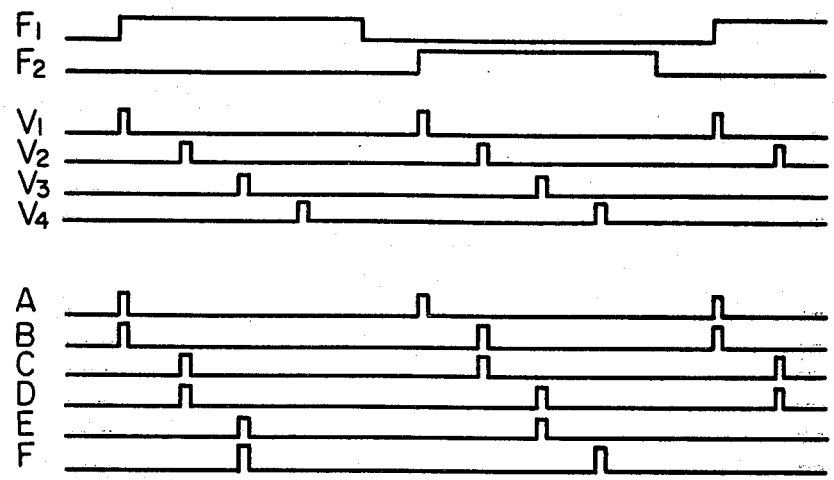
FIG. 3 shows a timing chart of pulses in the circuit of FIG. 2.
Figure 4:
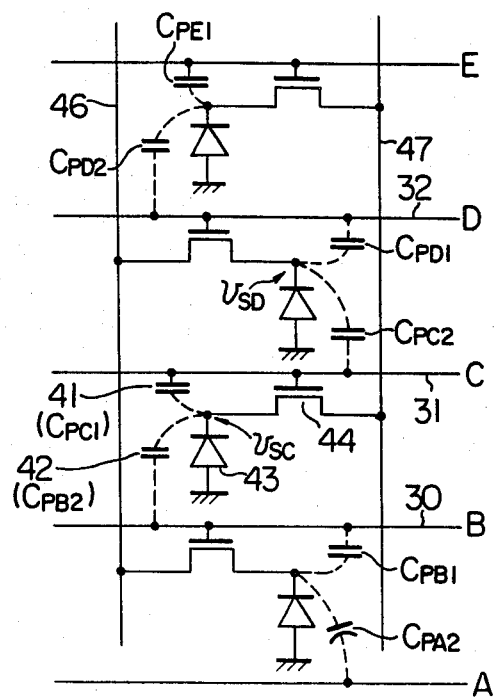
FIGS. 4 and 5 illustrate a mechanism of generation of flicker, FIG. 4 being a circuit diagram of a part of the device of FIG. 1 including some picture elements and FIG. 5 showing a pulse timing and a variation of a coupling capacitance.
Figure 5:
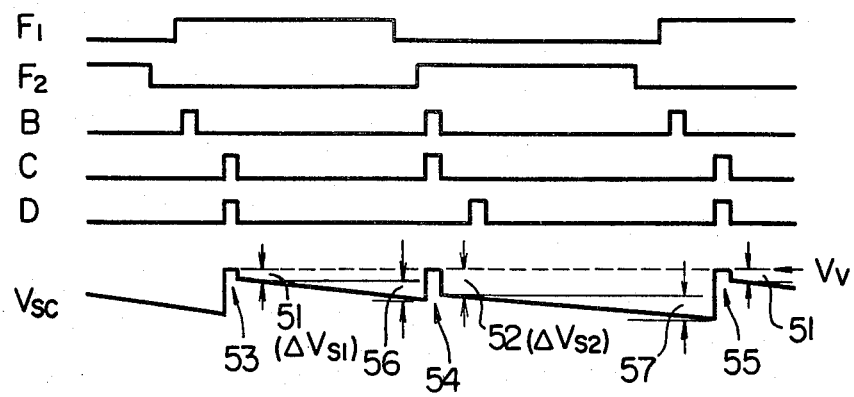

Referring to FIG. 4, it is assumed that B and C have been selected and turned ON, and B is to be first turned OFF and then C is to be turned OFF next. When B is turned OFF, the transistor 44 is still conducting. Accordingly, the potential $V_{SC}$ of the photodiode 43 is not affected by the presence of the coupling capacitance $C_{PB2}$ and the potential drops by the presence of the coupling capacitance $C_{PC1}$ when the vertical gate line 31 (C) is turned OFF. Accordingly, the variation of the potential of $V_{SC}$ is equal to that produced when C is turned OFF in the other field (in which $F_1$ is ON) where C and D are simultaneously selected. Thus, there is no variation among the fields and the flicker does not occur. According to the embodiment shown in FIGS. 7 and 8, the solid-state imaging device which is free from the flicker and enables the simultaneous selection of two vertical gate lines or picture element rows is provided. The change of $V_{SC}$ in the above operation is also shown in (b) of FIG. 8. FIG. 8 further shows a drive pulse timing (a) of the buffer circuit shown in FIG. 7. In FIG. 8, the offset of timing at the transition to OFF is presented by switching the timings of the pulses $P_1$, $P_3$, $P_2$, $P_4$ for each field.

It should be understood that the buffer circuit is not limited to the particular circuit shown in FIG. 7. For example, the drive pulse lines for $P_1$ and $P_2$ may be common. In this case, the timing is to be adjusted such that after $V_1$, $V_2$, . . . (vertical register outputs) have been changed from ON to OFF, the reset pulses $P_3$ and $P_4$ are turned ON. In this manner, the outputs (A, B, . . . ) as shown in (b) of FIG. 8 are produced. Conversely, $P_3$ and $P_4$ may be common. In this case, the common pulses $P_3$ and $P_4$ is synchronized with one of $P_1$ and $P_2$ which is later turned OFF.

An essential feature of the present invention resides in the solid-state imaging device operated in the simultaneous selection mode of two lines in which the gate line for the photodiode which has the coupling capacitance with only one of the two selected vertical gate lines is turned OFF first and the gate line for the photodiode which is encircled by the two selected vertical gate lines and has coupling capacitances therewith is turned OFF next so that the flicker which would otherwise be caused by the unbalance of the coupling capacitances among the fields is prevented and the high sensitivity solid-state imaging device which can produce a high quality of image under a low illumination is provided. The drive circuits and the pulse sequences are not limited to the illustrated examples.

While the horizontal scan in FIG. 6 is carried out by the horizontal switching MOSTs 3 and the horizontal shift register 5, it should be understood that the present invention is equally applicable to a solid-state imaging device which carries out the horizontal scan and read by a change transfer device (CTD) as shown in U.S. patent application Ser. No. 206,865 filed on Nov. 14, 1980 (or equivalent EPC Application No. 80.304072.4 filed on Nov. 13, 1980).

What is claimed is:
1. A solid-state imaging device comprising:
a photosensing unit having a plurality of picture elements arranged in a matrix form, each of said picture elements including a photo-electric conversion element and a switching insulated gate field effect transistor for reading an optical signal from said photoelectric conversion element;

vertical gate lines each connected to the gates of the switching insulated gate field effect transistors for the picture elements on the same row;

a vertical shift register for producing vertical scan pulses;

a simultaneous two-line selection circuit for simultaneously selecting two of said vertical gate lines to simultaneously read the two lines; and a buffer circuit inserted between said vertical gate lines and said simultaneous two-line selection circuit for first turning off the vertical gate line for the picture element row which has a coupling capacitance with only one of the two selected vertical gate lines and thereafter turning off the gate vertical line for the picture element row which has coupling capacitances with the two selected vertical gate lines.

2. A solid-state imaging device according to claim 1, wherein said buffer circuit includes transfer MOSTs which are provided for said vertical gate lines, respectively, said transfer MOSTs receiving as gate input pulses the output signals from said simultaneous two-line selection circuit and driven by drive pulses synchronized with the vertical scan pulses from said vertical shift register, and reset MOSTs which are controlled by reset pulses to reset said vertical gate lines.

3. A solid-state imaging device according to claim 2, wherein said simultaneous two-line selection circuit is an interlace scanning circuit which rearranges the two vertical gate lines to be selected in each field.

4. A solid-state imaging device according to claim 3, wherein said interlace circuit includes first to fourth field switching MOSTs connected to each stage of said vertical shift register, first and second field switching pulses being applied to the pair of said first and second field switching MOSTs and the pair of said third and fourth field switching MOSTs, respectively, so that said first and second field switching MOSTs are activated in a first field and said third and fourth field switching MOSTs are activated in a second field, by the vertical scan pulses sequentially produced from said vertical shift register and said first and second field switching pulses, to produce said gate input pulses for said transfer MOSTs of said buffer circuit.

5. A solid-state imaging device according to claim 4, wherein ones of the sources and drains of said first to fourth field switching MOSTs provided for each stage of said vertical shift register are connected to the output of a selected stage of said vertical shift register, the others of the sources and drains of the first field switching MOST provided for the preceding vertical shift register stage and of the fourth field switching MOST provided for the selected vertical shift register stage, the others of the sources and drains of the third and second field switching MOSTs provided for the selected vertical shift register stage, and the others of the sources and drains of the first field switching MOST provided for the selected vertical shift register stage and of the fourth field switching MOST provided for the next vertical shift register stage are, respectively, connected to the gates of the transfer MOSTs provided for the three successive ones of said vertical gate lines, and said first field switching pulse is applied to the gates of said first and second field switching MOSTs while said second field switching pulse is applied to the gates of said third and fourth field switching MOSTs.

6. A solid-state imaging device according to claim 5, wherein ones of the drains and sources of said transfer MOSTs are coupled to said drive pulses while the others of the drains and sources of said transfer MOSTs are connected to said vertical gate lines.

7. A solid-state imaging device according to claim 6, wherein the ones of the drains and sources of the transfer MOSTs connected to the odd row vertical gate lines are coupled to a first one of said drive pulses while the drains (sources) of the transfer MOSTs connected to the even row vertical gate lines are coupled a second one of said drive pulses, said first and second drive pulses changing from high levels to low levels at different timings.

8. A solid-state imaging device according to claim 6, wherein ones of the drains and sources of said reset MOSTs are connected to said vertical gate lines and the others of the drains and sources of said reset MOSTs are grounded.

9. A solid-state imaging device according to claim 8, wherein the gates of the reset MOSTs connected to the odd row vertical gate lines are coupled to a first reset pulse and the gates of the reset MOSTs connected to the even row vertical gate lines are coupled to a second reset pulse, said first and second reset pulses changing from low levels to high levels at different timings.

* * * * *